United States Patent [19]
Pederzini

[11] 3,949,371
[45] Apr. 6, 1976

[54] INPUT-OUTPUT SYSTEM HAVING CYCLICAL SCANNING OF INTERRUPT REQUESTS

[75] Inventor: Renzo Pederzini, Melegnano(Milan), Italy

[73] Assignee: Honeywell Information Systems, Inc., Phoenix, Ariz.

[22] Filed: Aug. 7, 1974

[21] Appl. No.: 495,362

[30] Foreign Application Priority Data
Aug. 22, 1973 Italy................................. 28082/73

[52] U.S. Cl. ............................................ 340/172.5
[51] Int. Cl.² . G06F 3/04; G06F 9/18; G05B 13/02; G08B 11/00
[58] Field of Search...................... 445/1; 340/172.5

[56] References Cited
UNITED STATES PATENTS
3,643,229  2/1972  Stuebe et al........................... 445/1
3,710,328  1/1973  Hunter et al........................... 445/1

*Primary Examiner*—Raulfe B. Zache
*Assistant Examiner*—Jan E. Rhoads
*Attorney, Agent, or Firm*—William W. Hollowày, Jr.; David A. Frank

[57] ABSTRACT

A system is disclosed for controlling access to a central information processor by a plurality of peripheral devices. The system determines access on the basis of a (1) predetermined hierarchical priority order and (2) a cyclical scanning process. To achieve this, a system of hierarchically organized priority levels is combined with a system of cyclical scanning in a manner such that no single device may monopolize the central processor.

10 Claims, 7 Drawing Figures

INPUT-OUTPUT SYSTEM HAVING CYCLICAL SCANNING OF INTERRUPT REQUESTS

BACKGROUND OF THE INVENTION

1. Field of the Invention

The present invention relates generally to the operation of information processing devices and, more specifically, to a system for asynchronously controlling the access of a plurality of such devices.

2. Description of the Prior Art

The operation of a data processing system calls for the use of a number of input-output devices in cooperation with a central controlling and processing unit, usually called a central processor. Often, if is required that the central processor asks information from, or gives information to, different peripheral devices, such as card readers, card punchers, printers, magnetic tape, or disk recorders, and so on. The operation of such peripheral devices is usually asynchronous. In most cases, operations performed on peripheral devices require time intervals much longer than the ones required by the central processor for controlling the same. In other words, the emission by the central processor of commands and pieces of information, and the reception, by the same, of signals representing the status of the peripheral devices, the checking of such status signals, the reception of data, the performing of operations related to peripherals, require a rather short intervention time, whereas the peripheral units need much longer time intervals for executing the received commands, and for processing the received data. These latter operations are, in any case, controlled in time by a clocking system independent from the clocking system of the central processor.

For an efficient exploitation of the central processor resources, the several peripheral units are therefore, usually operated according to the so-called time-sharing principle, whereby the central processor controls a plurality of peripheral units together, assigning to these units different time intervals. For the same purpose, namely, an efficient exploitation of resources, the assignment of subsequent time intervals to the control of the peripheral units is obtained by an arrangement of interrupt signals controlled by the central processor. Thus, the central processor attends to a peripheral unit only if and when the peripheral unit itself sends one or more suitable signals indicating that it is ready to accept signals from the central processor, or that it is requiring intervention by the central processor.

As no more than one interrupt request may be handled at a time, the central processor provides, by means of suitable selection circuits, attempts to settle the conflicts (which are generated by the simultaneous presence of several interrupt signals) by assigning to the various requests different priority levels and by answering the interrupt requests in the order of decreasing priority. It is known that the various peripheral units, according to the nature and to the particular type of intervention called for, have different timing requirements. For instance, a disk unit, which has to receive or to send data to and from the central processor, may perform these operations only according to a prefixed timing, and the time interval occurring between the transfer of two sequential data is very short. In the case of an asynchronous printer, the reception of a character to be printed may be delayed as long as wanted. Between these extremes there are intermediate requirements.

In U.S. Pat. application Ser. No. 419,312 filed on Nov. 24, 1973, an efficient method for accessing the central processor and assigning the priorities is described. Such an access system organizes the interruption requests according to a double criterion of hierarchy, by carrying out a first partition of the requests according to the priority levels, and then, within each level, further subdividing the requests according to the order of the physical channel employed for the connection to the peripheral units. However, it is subject to the disadvantage that the interrupt requests having the lowest priority are liable to be systematically ignored, because interrupt requests of higher priority may, in practice, monopolize for themselves the interventions of the central processor. This circumstance may typically affect the connection of a bufferized printer to the central processor. A bufferized printer is, of course, a slow peripheral unit, which may accept data within very wide time intervals after the sending of a data request. Such a bufferized peripheral unit may send out a request for a new datum almost immediately after having received a preceding one, even if it may tolerate without inconvenience a remarkable delay in the reception of the requested data. If the priority assigned to the requests of data sent by this device is not the lowest possible, it is clear that this peripheral unit may monopolize the central processor, even if this behavior is not wanted. This would be to the disadvantage of other peripheral units whose interrupt signals have a lower priority. Therefore, the operation of a number of bufferized units at the same time is a remarkably critical operation, since any one of them may become unduly privileged.

OBJECTS OF THE INVENTION

It is an object of the invention, therefore, to provide a system for controlling access to a plurality of information processing devices.

It is another object of the invention to provide an improved system of priority selection for servicing access requests by computer peripheral devices.

It is another object of the invention to provide an improved system for controlling computer peripheral devices which involves a simplified priority network structure.

It is still another object of the invention to provide an improved system for cyclical scanning of interrupt requests by computer peripheral devices.

These and other advantages will become apparent from the following description of the perferred embodiment of the invention when read in conjunction with the attached drawings contained herewith.

SUMMARY

The invention combines a system hierarchically organized priority levels with a system of cyclical scanning. The latter system cyclically acknowledges a group of interrupt requests for character exchange in such a way that, for each peripheral unit, only one character exchange request is answered prior to the performance of another complete scanning cycle. The cyclical scanning access system performs, in addition to the cyclical scanning of the requests for character exchange, the selection of the interrupt requests according to a predetermined hierarchical priority order. The system has the characteristic property that servicing requests always have higher priority than character exchange requests when the central processor is busy answering other servicing requests, but do not interrupt nor reset the scanning process when a character exchange operation has been answered. This is because the cyclical scanning access system defines two different priority levels, one for the servicing requests, and the other for the character exchange requests. However, the relative priority of these levels is not fixed, since they depend on the priority levels formerly acknowledged. In one case, the priority is given to the servicing requests and in the other case to the character exchange requests through the cyclical scanning operation.

DESCRIPTION OF THE PREFERRED EMBODIMENT

Figures 1, 2:
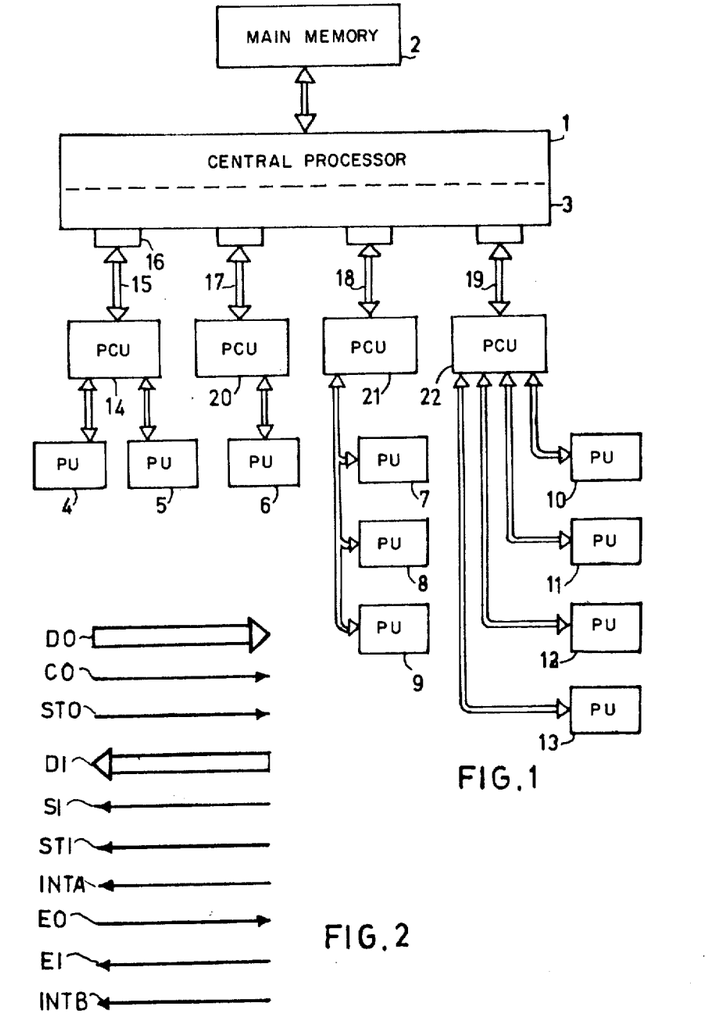
FIG. 1 is a schematic block diagram of a data processing system.
FIG. 2 is a schematic diagram of the physical structure of an interconnection channel.

FIG. 1 is a block diagram of a data handling system comprising a central processor 1, a main working memory 2, an information exchange control unit 3 (which is part of the central processor 1), and a plurality of peripheral units 4 to 13.

The peripheral units 4 and 5, for instance, are connected to the central processor 1 by means of a single peripheral control unit 14, which communicates with the central processor 1 by means of a set of wires forming the information exchange channel 15.

The channel 15 is connected to the central processor 1 by means of a plug-and-socket arrangement 16. The channel 15 is used as the information exchange channel for both the peripheral units 4, 5 connected to the peripheral control unit 14. In general, any number n of peripheral units may be connected to a single peripheral control unit. Therefore, a distinction is commonly made between the terms "channel" and "subchannel". By "channel" it is intended a set of wires and related specific resources of logical circuits and registers strictly associated to such set of wires, which enable the communication with the central processor. "Subchannel" designates the same set of wires processor and a specific peripheral unit selected among several ones connected to a common control unit. In the example considered, the channel 15 includes two subchannels for connection to the peripheral units 4, 5. Usually a central processor is provided with a plurality of sockets and channels plugged therein and with a larger number of subchannels.

FIG. 1 shows, as an example, four channels 15, 17, 18, 19 connected to as many controls 14, 20, 21, 22 respectively. Whenever a peripheral unit has to transfer to or receive from the memory 2 some information, a communication path must be established. This is accomplished within the central processor 1 by the information exchange unit 3 which, according to preestablished priority criteria, establishes the part of the path from the socket 16 to the memory 2. The remainder of the path from the plug corresponding to the socket 16 to the peripheral unit 4 is accomplished by and within the peripheral control unit 14 involved.

It is clear that, barring exceptions, when a channel is busy exchanging information with a given peripheral unit, (that is, when a given subchannel is connected to the central processor,) no other exchange of information may take place on the same channel.

Within the central processor, on the contrary, such overlapping is permitted by the "time-sharing" method by which different time intervals are assigned in sequence to the different channels for effecting partial exchanges of information according to priority criteria established by the information exchange control unit.

FIG. 2 shows, in schematic form, the physical structure of an interconnection channel. A set of nine wires as a whole forms a channel DO for the parallel transfer of binary eight-bit coded information, and of a check (or parity) bit. The pointing of the arrow to the right indicates that the information comes from the central processor. The wire CO is employed for forwarding to the peripheral control unit a signal specifying whether the information on channel DO is to be considered as a command signal or as an address for a peripheral unit and not as a datum. The wire STO is employed to forward to the peripheral control unit a timing pulse, or "strobe". The signals on channel DO and on wire CO are effectively recognized only during said pulse.

Channel DI and wires SI and STI have analogous functions, that is, to transfer information from a peripheral control unit to the central processor, to send to the central processor a signal characterizing the information on channel DI as a datum or as a status of a peripheral unit, and to carry a strobe signal respectively.

The wire INT A is employed to send an interrupt request of a first type, for instance for requiring that the central processor takes into account peculiar events or status of a peripheral unit and, generally, for requiring from the central processor the performing of predetermined services.

The wire INT B is employed for sending an interrupt request of a second type, for instance, for requiring from the central processor the receiving or the sending of a character.

This interface organization clearly demonstrates that the computer may acknowledge two different types of requests: requests for a service in general, and requests for character exchange. This is only set out as an example, as in general, a single interrupt request signal or a plurality of interrupt requests forwarded on different wires may be used.

The use of a specific signal for character interchange is convenient because it frees the system from the need of executing, for each character interchange request, a complex information exchange for recognizing the specific reason of the forwarded interrupt request, thus speeding up the operation of character exchange. Finally, the wires EI and EO are employed for a signalling from the peripheral, or from the central processor, respectively, the end of an information exchange, or of a predetermined phase of the same.

The set of wires and signals in FIG. 2 and described above form an interconnection channel and have an associated unit called an interface. A certain number of registers, suitably timed, is associated with each channel, both within the central processor and within the peripheral control unit in order to sustain the received or transmitted information.

Before considering the organization and the operation of the information exchange control unit 3, it is useful to illustrate briefly and as an example, a possible form of information exchange through an interface, together with the related clock signals.

Consider again the channel 15, the peripheral control unit 14 and the peripheral units 4, 5 of FIG. 1.

It is assumed that the peripheral control unit 14 has to send to the central processor 1 information regarding the status of a peripheral unit (for instance, the peripheral unit 5). The peripheral control unit 14 sends to the central processor 1 an interrupt request INT A. (Hereafter the signals will be indicated only by the reference name of the wires which carry them).

Figure 3:
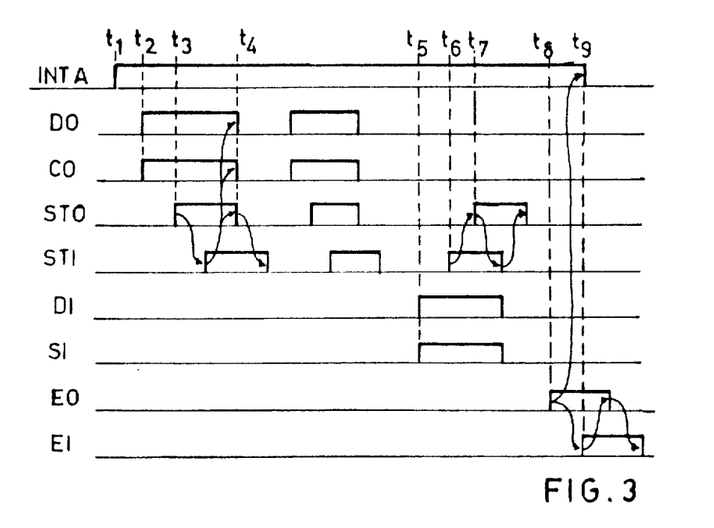
FIG. 3 is a plurality of time diagrams showing an exchange of information for services on the connection channel.

FIG. 3 shows that at instant $t_1$, the signal INT A goes from binary level 0 to the binary level 1. After a time interval (which depends on the circumstances, that is, whether the central processor 1 is busy performing an operation having a higher priority level than the interrupt request INT A,) the central processor 1 responds to said interrupt request INT A by sending on channel DO a command signal together with a signal characterizing the command on wire CO, and a clock signal on wire STO. The signals DO and CO change from level 0 to level 1 at time $t_2$, and signal STO changes at time $t_3$.

As soon as the peripheral control unit 14 receives the rising from of the signal STO, it stores the command in an input register and sends back reception signal STI. When the central processor 1 receives signal STI at time $t_4$, it returns the signals on wires DO, CO, STO to level 0. the peripheral control unit 14 then returns the signal STI to zero. Thereafter, if wanted, the central processor 1 may send other command signals in succession with the same timing procedure (shown, as an example as the pulses on wires DO, CO, STO, STI in the interval between times $t_4$ and $t_5$). Such command signals may, for instance, require from the peripheral control unit 14 the coded name of the interrupting peripheral, and the reason of the interrupt request. The peripheral control unit 14, after reception of such commands, sends back on channel DI the required information.

FIG. 3 shows that at time $t_5$ a character is forwarded on channel DI accompanied by the characterizing signal SI and, after a certain delay, by the clocking signal STI at time $t_6$.

As soon as the signal STI is received at time $t_7$, the central processor 1 loads the information forwarded by channel DI into a suitable input register, and sends a reception signal STO. On reception of this signal STO, the peripheral control unit 14 returns the data signals on channel DI as well as the signals SI and STI to zero.

If other data must be sent, the process is repeated. When all required information has been received, the central processor 1 sends an "end of information exchange" signal by using the wire EO at time $t_8$, and the peripheral control unit 14 answers by raising a signal EI at time $t_9$. On reception of EO at $t_9$, the peripheral control unit 14 returns the interrupt request signal INT A to zero. The reception of signal EI causes the signal EO to fall to zero, and this causes signal EI to fall in turn. The information exchange is terminated.

In case of the central processor requiring intervention on a peripheral, the described procedure is initiated by the central processor. The only difference, in this case, is the absence of signal INT A, and possibly, the absence of any information sent by the peripheral control unit to the central processor.

The described procedure may be used for initiating a data transfer to or from the central processor. A first phase of exchange of command signals (as the one described above) is followed by a phase of effective data transfer, which may be controlled as described hereafter.

Figure 4:
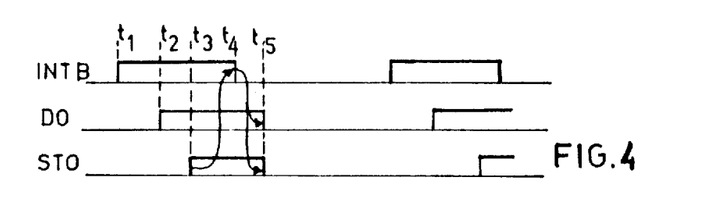
FIG. 4 is a plurality of time diagrams showing an information exchange for sending a character from the central processor to a peripheral unit.

In FIG. 4, as soon as the involved peripheral 5 is ready for receiving a datum at time $t_1$, it sends an interrupt request on wire INT B. When the central processor 1 is ready to answer the interrupt request INT B, that is, if the central processor 1 is not performing or is not to perform interrupt requests of higher priority level, it sends a datum on channel DO at time $t_2$ accompanied by the clocking signal STO at time $t_3$. The peripheral control unit 14 immediately accepts this datum and lets the interrupt request signal INT B fall at time $t_4$ causing the central processor 1 to let fall the signals on channel DO and on wire STO at time $t_5$.

When the involved peripheral 5 is again ready to receive another datum, it forwards a new interrupt request on wire INT B, and so on. At the end of the data transfer, either the peripheral control unit 14 or the central processor 1 informs the counterpart by the exchange of signals EO and EI.

Figure 5:
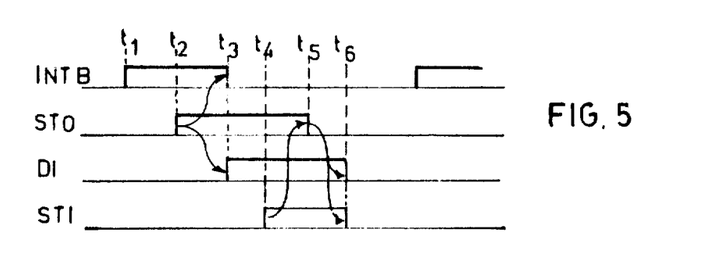
FIG. 5 is a plurality of time diagrams showing an information exchange for sending a character from a peripheral unit to the central processor.

The process is the same in the case of data transfer from the peripheral 5 to the central processor as shown in FIG. 5. As soon as the peripheral 5 is ready to send a datum, it sends the signal INT B at a time $t_1$. As soon as the central processor 1 is ready, it answers by the signal STO at time $t_2$. At time $t_3$, when the peripheral control unit receives the signal STO, it lets the interrupt request INT B fall to zero and sends the datum on channel DI, accompanied by signal STI at time $t_4$.

The central processor 1 accepts the datum and answers by letting the signal STO fall to zero at time $t_5$. The peripheral control unit 14 sets the channel DI free, and lets the signal STI fall at time $t_6$. When the peripheral 5 is ready to send a new data, a new interrupt request INT B is forwarded.

In FIGS. 3, 4 and 5, the arrows pointing in succession to the different rising and falling fronts indicate the interdependence of the signals.

It is clear that a relatively long delay time may occur between the forwarding of an interrupt request, either for a service or for character interchange. This is due to the fact that the central processor may be busy in performing operations of higher priority level.

The task of assigning the central processor to perform channel operations is carried out by a priority assigning network which forms an aspect of the invention. In order to provide a complete description of the priority assigning network, a preferred embodiment is described wherein the cyclic scanner is employed in combination with a multilevel priority selecting network. However, with the proper simplifications which will be described later, it is possible to use the cyclical scanner alone. the FIGS. 6 and 7 show, in combination, the priority assigning network for a data processing system having four channels.

Figure 6:
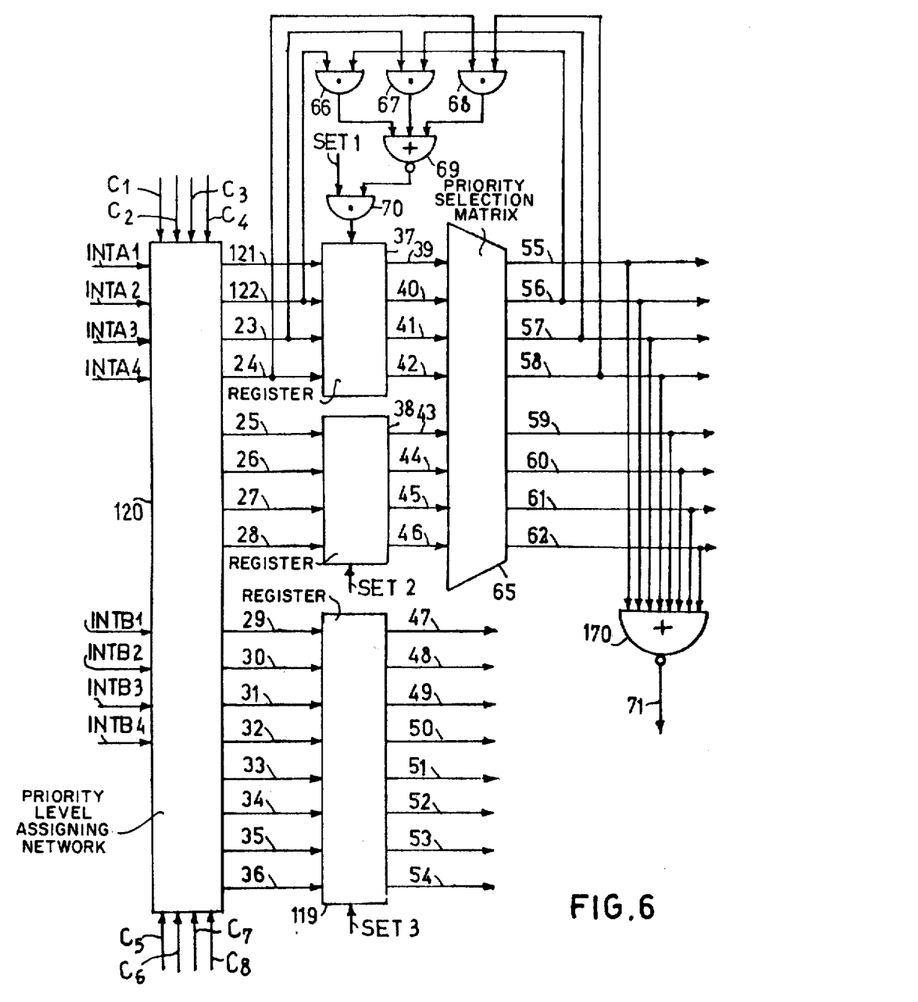
FIGS. 6 and 7, in combination, are schematic diagrams of a priority assigning network.
Figure 7:
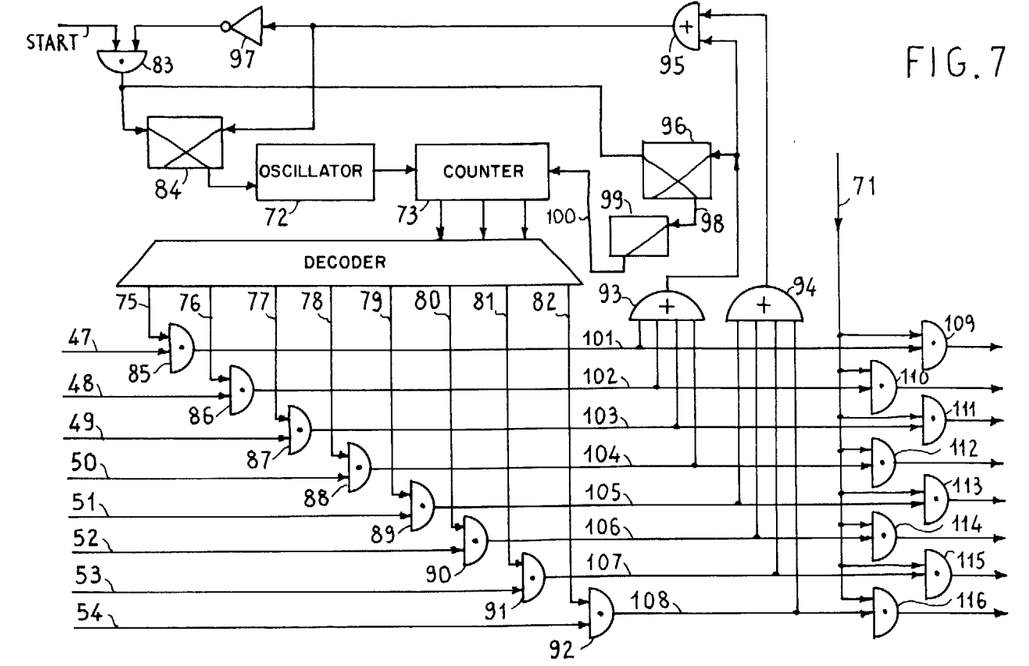

Referring now to FIG. 6, the interrupt requests for services and for character interchanges are forwarded on two wires for each channel. Such wires are indicated by: INT A 1, INT A 2, INT A 3, INT A 4, INT B 1, INT B 2, INT B 3, INT B 4, thus indicating for each wire the interrupt type (A for service, B for character interchange) and the order number of each channel.

The interrupt wires lead to a priority assigning network 120 which is controlled by suitable commands C1 to C8 from the central processor, assigning to the different interrupt signal a suitable level of relative priority. This priority assigning network is described in the U.S. Pat. Application Ser. No. 419,312 filed Nov. 24, 1973 and therefore will not be explained in detail.

To understand the invention, it is sufficient to point out that this priority assigning network acts as a switching network controlled by commands $C_1$ to $C_8$, and therefore each one of the input wires INT A 1 to INT B 4 may be selectively connected to any one of two output wires, selected among the set of output wires 121, 122 and 23 to 36.

For example, the wire INT A 1 may be connected, according to the presence or the absence of command $C_1$ to wire 121 or to wire 29, the wire INT A 2 may be connected, according to the presence or absence of command $C_2$ to wire 122 or to wire 30, and so on.

A fixed priority, in decreasing order, is assigned to the wires 121, 122, 23 to 36, as illustrated in the cited patent application. The priority assigning network allows a change in the relative priority level of an interrupt signal INT A 1 to INT B 4 as the inputs to the priority assigning network. The wires 121, 122, 23, 24 may, for instance, provide the highest priority level for service requests.

The wires 25 to 28 may pertain to a second priority level, for character interchange requests, having a priority lower than the first level.

The wires 29 to 36 may pertain to a third priority level, for service requests with a priority lower than the second level character exchange requests, and for lower priority character exchange requests. Within this level the wires 29 to 32 are assigned to service requests and wires 33 to 36 are assigned to character interchange requests. The signal forwarded on wires 121 to 24 are stored in a register 37 at a given time, as defined by a command SET 1 sent by the central processor periodically at the end of each machine cycle.

The signal forwarded on wires 25 to 28 are stored in a register 38 at a time defined by a command SET 2 sent by the central processor at the same time as SET 1. The output of registers 37 and 38, indicated by numerals 39 to 46 are applied as inputs to a priority selecting matrix 65 described in the cited patent application and represented in FIG. 5 of the cited patent application. The function of this matrix is to deliver, on one of the outputs numbered from 55 to 62 the signal having the highest priority of all of those applied as the inpupts 39 to 46. Therefore, on the wires 39 to 46, several interrupt signals may be present at the same time, whereas on wires 55 to 62, only the highest priority signal is present.

As already seen, the interpreting and recognizing of an interrupt request requires, at least for the service requests, a rather complex information exchange for a time interval corresponding to several machine cycles. As the SET signals (SET 1, SET 2, SET 3) allow the loading of registers 37, 38, 119 at each cycle, each service request or each character exchange request, if it requires more than one cycle, could be interrupted by any interrupt request having a higher priority level.

To prevent this, the answering of some interrupt requests may be made non-interruptible. One of such networks to achieve non-interruptibility is represented in FIG. 6. The output 122 from the priority assigning network 120 and the corresponding output 56 from the priority selection matrix 65 are connected as the inputs to an AND gate 66.

Similarly, the output 23 and the corresponding output 57 are connected as the inputs to the AND gate 67; the outputs 24 and 48 are connected as the inputs to the AND gate 68.

The outputs of the AND gates 66, 67, 68 are connected as inputs of a NOR gate 69 whose output, through AND gate 70, controls the applying of signal SET 1 to register 37.

If an interrupt request is forwarded on any of the wires 122, 23, 24 and register 37 is not loaded, the first signal of SET 1 which is received enables the loading of register 37 and the forwarding of the interrupt request on the corresponding output load from matrix 65. From then on, each subsequent signal from SET 1 is inhibited by the control network until the interrupt request at the input of register 37 falls to zero. Other interrupt requests, even if they have higher priority, can not be acknowledged until the preceding interrupt request is executed.

However, the interrupt signals having lower priority, forwarded on wires 25 to 28, are automatically ignored by the priority assigning matrix if an interrupt request of higher priority is present. Therefore, the interrupt requests forwarded on wires 121 to 24 are mutually non-interruptible, even if they may interrupt requests having a lower priority, such as those forwarded on wires 25 to 28.

It is clear that the interrupt requests on wires 25 to 28 may also form a level of mutually non-interruptible interrupt requests, if a control network similar to the one described is provided.

The signals on the output wires 47 to 54 of register 119 form a third priority level which, according to the invention, is cyclically scanned by a scanner circuit. As the priority level being scanned is conveniently the lowest one, and it is intended that the higher levels have interrupting power over this level, a NOR gate 170 is provided, having on its inputs all the outputs of the priority selecting matrix 65. This circuit delivers on its output 71 a level "1" signal only if no interrupt request is forwarded on wires 55 to 62. This signal, which will hereafter be called ENABLE, is employed for letting the interrupt requests scanned by the scanner be acknowledged only in the absence of interrupt requests of higher priority.

FIG. 7 shows the remainder of the priority assigning network. It is substantially composed of an oscillating circuit 72 and a counter 73 which, in the example, is a binary counter of three bits. The outputs of the counter 73 are decoded by the decoder 74 which converts the binary code at the input to a decoded signal present on only one of the eight output wires 75 to 82. Other elements of the scanner are a two input AND gate 83, a flip-flop 84, a first set of eight two-input AND gates 85 to 92, a pair of four-input OR gates 93 and 94, a two-input OR gate 95, a flip-flop 96, an inverter 97, a differentiator 99 (which may be replaced by a one-shot circuit) and a second set of eight-input AND gates 109 to 116.

The operation of the circuit is as follows:

A start pulse is transmitted through AND gate 83 only if the output of the inverter 97 is at binary level "1". This condition is verified, as it will be seen later, if no interrupt request acknowledged by the cyclic scanner is being answered.

The start pulse is a cyclical pulse, slightly delayed with respect to the cyclical pulses SET 1, SET 2, SET 3. It is convenient to remember that the SET 3 pulse may load into register 119 interrupt requests which, following such pulse, appear on the output wires 47 to 54. The output of the AND gate 83 provides both a reset pulse for the flip-flop 96 and a command pulse for setting the flip-flop 84.

The output of flip-flop 84 enables the operation of the oscillator 72, which in turn delivers to counter 73 pulses which let it advance from a given binary value to the next one.

It follows therefrom, that at the output of decoder 72, a binary level "1" signal is forwarded in succession on a single one of the wires 75 to 82.

For instance, a binary code of all zeros at the output of the counter may be associated with a signal on wire 75, the code 001 with a signal of wire 76, and so on. If an interrupt request is applied on one of the wires 47 to 54, for instance to wire 50, the contemporary presence of a signal delivered by the decoder 74 on the wire 78 to the input of the corresponding AND gate 88, lets a signal of level one referred to as STOP, appears at the output of AND gate 88.

This signal, through the OR gates 93, or 94 and 95 resets the flip-flop 84, stops the oscillator 72 and therefore also the counter in the last position reached.

The same signal appplied to the input of inverter 97 brings its output to level zero, and inhibits, therefore, other subsequent START signals from being applied to flip-flop 84 until the interrupt request being answered is completely executed. However, this interrupt requesst is effectively acknowledged only when no interrupt request of higher priority levels is present, that is, if the ENABLE signal 71 enables AND circuits 109 to 116 to transfer the interrupt requests. When the interrupt request has been executed, the signal on wire 50 falls to zero, at the time defined by the signal SET 3 which sets the register 119 in a new condition, and, therefore, the STOP signal also falls to zero. Thus, the AND gate 83 is enabled again, and the START signal may start the oscillator 72 and let counter 73 advance. The counter 73 may continue to operate the cyclical scanning until a new interrupt request is acknowledged on one of the wires 47 to 54.

The outputs 101 to 108 of the various AND circuits 85 to 92 are the equivalents of the outputs of the priority selecting matrix 65: only one interrupt request at a time may appear on these outputs and it appears only on the one output selected by the cyclical scanning device.

It should be noted that the outputs 101 to 104 are connected to the inputs of the OR gate 93 and the outputs 105 to 108 to the inputs of the OR gate 94. A signal on any one of the wires 101 to 108 delivers a STOP signal through the OR gates 93, 94 and 95, whereas only the signals on wires 101 to 104 through the OR circuit 93 deliver a signal which sets the flip-flop 96. The flip-flop 96 is reset by the signal delivered by AND gate 83. As the flip-flop 96 is reset, the output 98 of the flip-flop goes over from the binary level "1" to level "0".

The change on the electric level associated with the change of the binary level is detected by the differentiator 99. In response to said level change, the differentiator 99 delivers a reset pulse over line 100 to the counter 73. This resets the counter 73 to the start position (for instance an all zero pattern).

It may be seen that the operating mode of the cyclical scanner is different, according to whether the interrupt requests are forwarded on wires 47 to 50 or on wires 51 to 54. In the first case, when the interrupt request is answered, the cyclical scanner resumes the scanning of other interrupt request starting from wire 47, that is, it ascribes a priority level to the interrupt requests on wires 47 to 50. In the other case, the scanner goes on in its search starting from the request immediately subsequent to the one formerly answered. Any interrupt request forwarded on the wires preceding the one being scanned loses any priority recognition. Therefore, as long as the cyclical scanner operates in the scanning mode, and scans the set of wires 47 to 50, which may be a set of wires for service requests, it behaves like a priority selecting matrix. The interrupt requests forwarded are acknowledged according to the priority order, even if they may not interrupt each other. In contrast, when the scanner operates in the scanning mode on the wires 51 to 54, the scanning is effectively a cyclical one.

This employ of the cyclical scanner with intermediate zeroing appears to be remarkably convenient for acknowledging the character exchange requests having low urgency such as those forwarded by parallel printers provided with a buffer. If a printer of this type forwards, for instance, an interrupt request on wire 51, the cyclical scanning device according to the invention ensures that this printer does not monopolize the central processor because, after answering this interrupt request, it is certain that possible interrupt requests on wires 52, 53, 54 will be searched before a new interrupt request on the same peripheral is answered. In any case, before the same peripheral is answered twice, possible interrupt requests on the wires having higher priority, such as wires 47 to 50, will be scanned.

What is claimed is:

1. In an electronic computer having a plurality of input/output channels for connection of a corresponding plurality of peripheral control units to a central processor, a system for acknowledging input/output interrupt requests sent by said peripheral control units to the central processor comprising:
   a first ordered plurality of interrupt wires, each for transmitting first level interrupt request signals from a corresponding one of said peripheral control units to said central processor;
   a second ordered plurality of interrupt wires, each for transmitting second level interrupt request signals from a corresponding one of said peripheral control units to said central processor;
   a plurality of gates, one for each of said interrupt wires, for gating the signal flow over said wires;
   scanning means coupled to said gates for enabling in sequence, one at a time, said gates;
   first control means coupled to said scanning means and responsive to said gates for stopping said scanning means when an interrupt request signal is passed through one of said gates;
   second control means for resetting said scanning means in a predetermined status following an interrupt request passed through one of said gates on said first plurality of interrupt wires and for activating said scanning means from said predetermined status in response to the falling off of said interrupt request passed through said one of said gates; and third control means for activating said scanning means in response to the falling off of an interrupt request passed through one of said gates on said second plurality of interrupt wires.

2. The system of claim 1 wherein said scanning means comprises:

switching means for generating a first and a second signal;

oscillating means responsive to said switching means for generating a series of clock signals, said oscillating means turning on in response to said first signals and said oscillating means turning off in response to said second signals;

counting means responsive to said clock signals; and decoding means coupled to said counting means and including a plurality of ordered output lines, each output line coupled to one of said gates, an enabling signal appearing on each of said output lines in sequential order.

3. The system of claim 2 wherein said first control means further comprises:

first gating means coupled to receive output signals from said gates and coupled to said switching means for causing said switching means to generate said second signal.

4. The system of claim 2 wherein said second control means comprises:

second gating means coupled to receive output signals from said gates coupled to said first plurality of interrupt wires, said second gating means coupled to said switching means for causing said switching means to generate said first signal; and reset means responsive to said second gating means and coupled to said counting means for generating a reset signal for said counting means.

5. The system of claim 2 wherein said third control means comprises:

third gating means coupled to receive output signals from said gates coupled to said second plurality of interrupt wires, said third gating means coupled to said switching means for causing said switching means to generate said first signal.

6. In an electronic computer having a plurality of peripheral control units for connection to a central processor, a system for acknowledging input/output interrupt request signals sent by said peripheral control units to said central processor comprising:

a plurality of input/output channels, each of said channels coupling one of said peripheral control units to said central processor, said channels including:

a first plurality of interrupt wires, each for transmitting first level interrupt request signals from one of said pripheral control units to said central processor;

a second plurality of interrupt wires, each for transmitting second level interrupt request signals from one of said peripheral control units to said central processor;

a third plurality of interrupt wires, each for transmitting third level interrupt request signals from one of said peripheral control units to said central processor;

a priority selecting network coupled to said first plurality of interrupt wires for acknowledging the first level interrupt request signal having the highest priority among all the first level interrupt request signals appearing on said first plurality of wires;

a plurality of gates, one for each of said wires of said second and said third pluralities of interrupt wires for controlling the signal flow over said wires;

scanning means coupled to said gates for enabling in sequence, one at a time, said gates;

first control means coupled to said scanning means and responsive to said gates for stopping said scanning means when an interrupt request signal has passed through one of said wires;

second control means for resetting said scanning means in a predetermined status following one of said second level interrupt request signals being passed through one of said gates coupled to said second plurality of interrupt wires and for activating said scanning means from said predetermined status in response to the falling off of said one second level interrupt request signal; and third control means connected to said gates coupled to said wires of said third plurality for activating said scanning means in response to the falling off of one of said third level interrupt request signals.

7. The system of claim 6 wherein said scanning means comprises:

switching means for generating a first and a second signal;

oscillating means responsive to said switching means for generating a series of clock signals, said oscillating means turning on in response to said first signals and said oscillating means turning off in response to said second signals;

counting means responsive to said clock signals; and decoding means coupled to said counting means and including a plurality of ordered output lines, each output line coupled to one of said gates, an enabling signal appearing on each of said output lines in sequential order.

8. The system of claim 7 wherein said first control means comprises:

first gating means coupled to receive output signals from said gates and coupled to said switching means for causing said switching means to generate said second signal.

9. The system of claim 7 wherein said second control means comprises:

second gating means coupled to receive output signals from said gates coupled to said second plurality of interrupt wires, said second gating means coupled to said switching means for causing said switching means to generate said first signal; and reset means responsive to said second gating means and coupled to said counting means for generating a reset signal for said counting means.

10. The system of claim 7 wherein said third control means comprises:

third gating means coupled to receive output signals from said gates coupled to said third plurality of interrupt wires, said third gating means coupled to said switching means for causing said switching means to generate said first signals.

* * * * *

UNITED STATES PATENT AND TRADEMARK OFFICE
CERTIFICATE OF CORRECTION

PATENT NO. :     3,949,371
DATED      :     April 6, 1976
INVENTOR(S) :    Renzo Pederzini It is certified that error appears in the above—identified patent and that said Letters Patent are hereby corrected as shown below:

Assignee:   Honeywell Information Systems Italia
            Caluso, Italy

Signed and Sealed this

Twelfth Day of October 1976

[SEAL]

Attest:

RUTH C. MASON
*Attesting Officer*

C. MARSHALL DANN
*Commissioner of Patents and Trademarks*